United States Patent

Kodaka

[11] Patent Number: 5,719,709
[45] Date of Patent: Feb. 17, 1998

[54] LENS BARREL HAVING BIASING FORCE ADJUSTING MEMBER

[75] Inventor: Yoshiro Kodaka, Kawasaki, Japan

[73] Assignee: Nikon Corporation, Tokyo, Japan

[21] Appl. No.: 649,836

[22] Filed: Apr. 30, 1996

[30] Foreign Application Priority Data

Jun. 7, 1995 [JP] Japan .................. 7-140626

[51] Int. Cl.⁶ .................. G02B 15/14; G02B 7/02
[52] U.S. Cl. .................. 359/694; 359/699; 359/823
[58] Field of Search .................. 359/694, 699, 359/704, 823

[56] References Cited

U.S. PATENT DOCUMENTS 5,285,322 2/1994 Horning et al. .................. 359/826
5,587,754 12/1996 Katayama et al. .................. 396/144

Primary Examiner—David C. Nelms
Assistant Examiner—John P. Cornely

[57] ABSTRACT

A lens barrel has a movable lens unit movable in an optical-axis direction, a lens moving member for moving the movable lens unit and a frictional force applying member for applying a frictional force on the lens moving member so that a quantity of force for operating the lens moving member remains the same irrespective of a magnitude of the moving force for moving the movable lens unit.

5 Claims, 5 Drawing Sheets

LENS BARREL HAVING BIASING FORCE ADJUSTING MEMBER

BACKGROUND OF THE INVENTION

1. Field of the Invention

The present invention relates generally to a lens barrel and, more particularly, to a lens barrel with an improved operability of a lens moving member.

2. Related Background Art

In this kind of lens barrel, a focal length has hitherto been adjusted while moving a movable lens unit in an optical-axis direction by operating an operation member provided on an outer peripheral surface thereof. Herein, the operation member is a zoom ring or the like movable in a circumferential direction about the optical axis. In the conventional lens barrel, the zoom ring engages with a cam member formed with a cam groove so as to move interlocking therewith in the circumferential direction, and, further, the cam member engages with a lens support member for supporting the movable lens unit through the cam groove. Accordingly, when rotationally operating the operation member, the cam member also rotates correspondingly, and, further, each lens support member moves back and forth in the optical-axis direction in accordance with a shape of the movable cam groove.

By the way, a moving quantity of the movable lens unit is not always fixed with respect to a variation quantity of the focal length. For instance, on a wide-angle side, the moving quantity with respect to the same variation quantity of the focal length becomes larger than on a telescopic side. Hence, when using the cam member in which an angle of the cam groove to the optical axis is always fixed, it follows that the zoom ring is rotated much to adjust the focal length on the wide-angle side but rotated slightly on the telescopic side. In the lens barrel described above, the zoom ring is hard to operate and undesirable in terms of its appearance because of an ill-formed focal length scale inscribed on the outer peripheral surface of the lens barrel.

Under such circumstances, the prior art lens barrel uses the cam member in which the angle made by the optical axis and the cam groove gradually changes corresponding to the focal length, and the moving quantity of the movable lens unit with respect to the unit rotational angle of the cam member is set large on the wide-angle side but small on the telescopic side. With this setting, the interval of the focal length scale is fixed regardless of a value of the focal length.

In the above-described conventional lens barrel, however, the moving quantity of the movable lens unit with respect to the unit rotational angle of the cam member differs depending on the wide-angle side and the telescopic side, and hence a load torque applied on the cam member changes depending on a rotational position of the cam member. Consequently, there arises a problem wherein the operation force quantity of the operation member does not remain the same and is uneven, resulting in a bad sense of operation.

SUMMARY OF THE INVENTION

Accordingly, it is a primary object of the present invention, which was contrived to obviate the above-mentioned problems, to provide a lens barrel in which a quantity of force for operating a lens moving member remains the same irrespective of a moving state of a movable lens unit.

To accomplish the above object, according to the present invention, a lens barrel comprises a movable lens unit movable in an optical-axis direction, a lens moving member for moving the movable lens unit and a frictional force applying member for applying a frictional force on the lens moving member so that a quantity of force for operating the lens moving member remains the same irrespective of a magnitude of the moving force for moving the movable lens unit.

The frictional force applying member has a frictional portion for generating the frictional force, a biasing member for biasing the frictional portion and a biasing force adjusting member for adjusting a biasing force of the biasing member corresponding to a magnitude of the moving force for moving the movable lens unit. The frictional force generated in the frictional portion is thereby increased or decreased with a variation in the biasing force of the biasing member.

The lens moving member has a biasing force adjusting member. The biasing force adjusting member is a cam member formed with a lens moving cam groove for moving the movable lens unit in the optical-axis direction and movable in a circumferential direction about the optical axis. The cam member is further formed with a cam member moving cam groove for moving the cam member in the optical-axis direction corresponding to the magnitude of the moving force for moving the movable lens unit. The biasing force of the biasing member is thereby changed with the movement of the cam member in the optical-axis direction.

According to the present invention, the lens moving member moves the movable lens unit. The frictional force applying member applies the frictional force on the lens moving member so that the quantity of force for operating the lens moving member remains the same irrespective of the magnitude of the moving force for moving the movable lens unit.

The biasing member biases the frictional portion, and the frictional force is generated in the frictional portion. Further, the biasing force adjusting member adjusts the biasing force of the biasing member. The cam member moves the movable lens unit in the optical-axis direction through the lens moving cam groove by its being moved in the circumferential direction about the optical axis. Simultaneously, the cam member, upon receiving action from the cam member driving cam groove, moves in the optical-axis direction corresponding to the magnitude of the moving force for moving the movable lens unit, thereby changing the biasing force of the biasing member.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be discussed in greater detail with reference to the accompanying drawings.

First Embodiment

Figure 1:
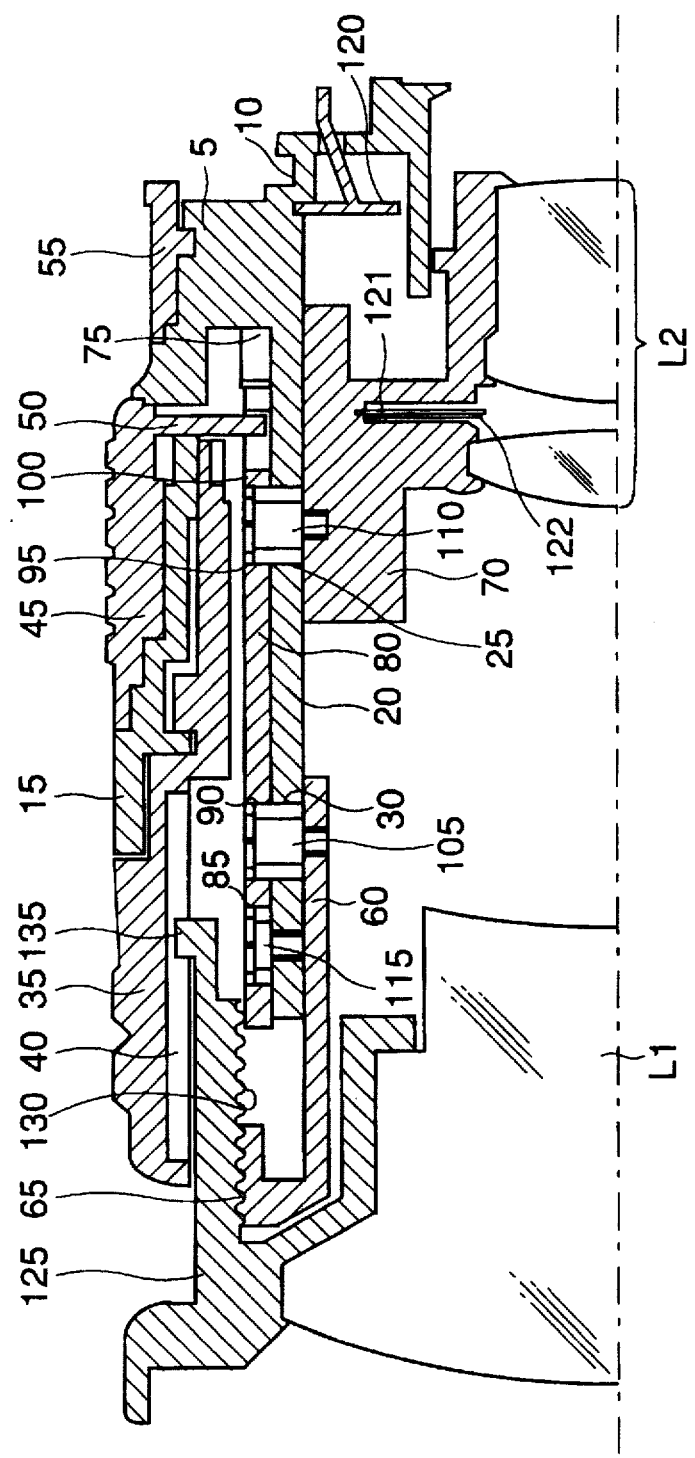
FIG. 1 is a sectional view of a first embodiment of the present invention but illustrates where an optical system of a zoom lens barrel is disposed for a wide-angle image photography.
Figure 2:
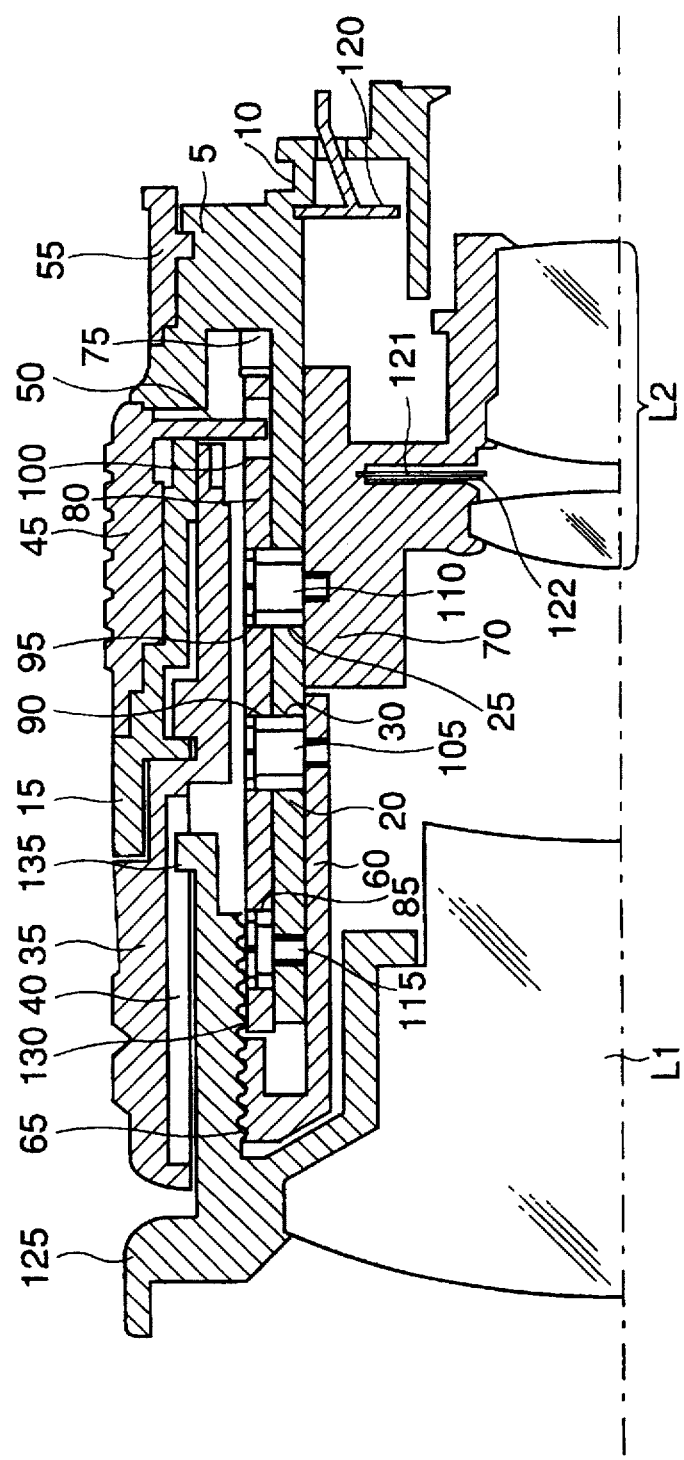
FIG. 2 is a sectional view of the first embodiment of the present invention but illustrates where the optical system of the zoom lens barrel is disposed for a telescopic image photography.
Figure 3:
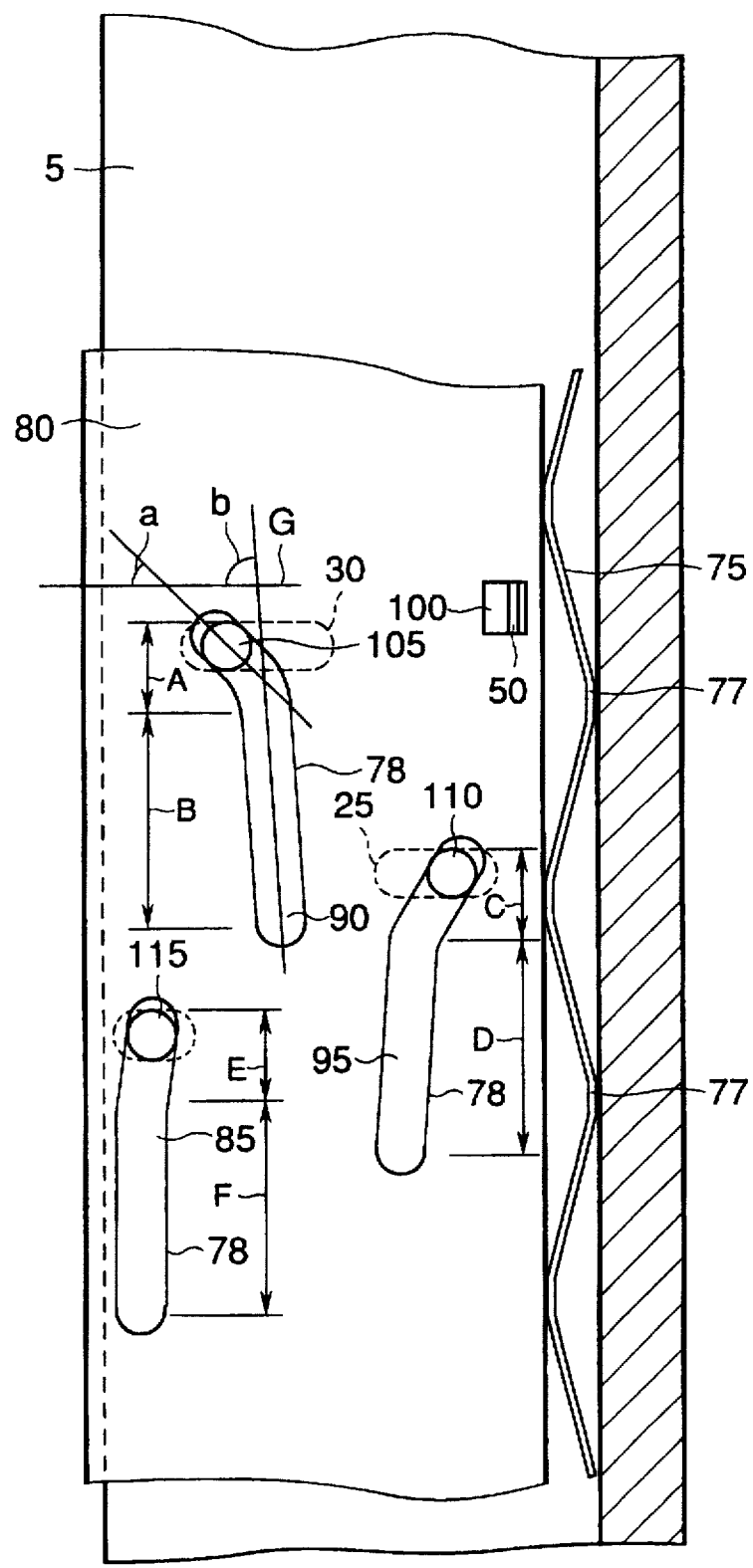
FIG. 3 is a development view corresponding to FIG. 1 and showing a positional relationship between a cam member, an engagement pin and a biasing member among components of the first embodiment.
Figure 4:
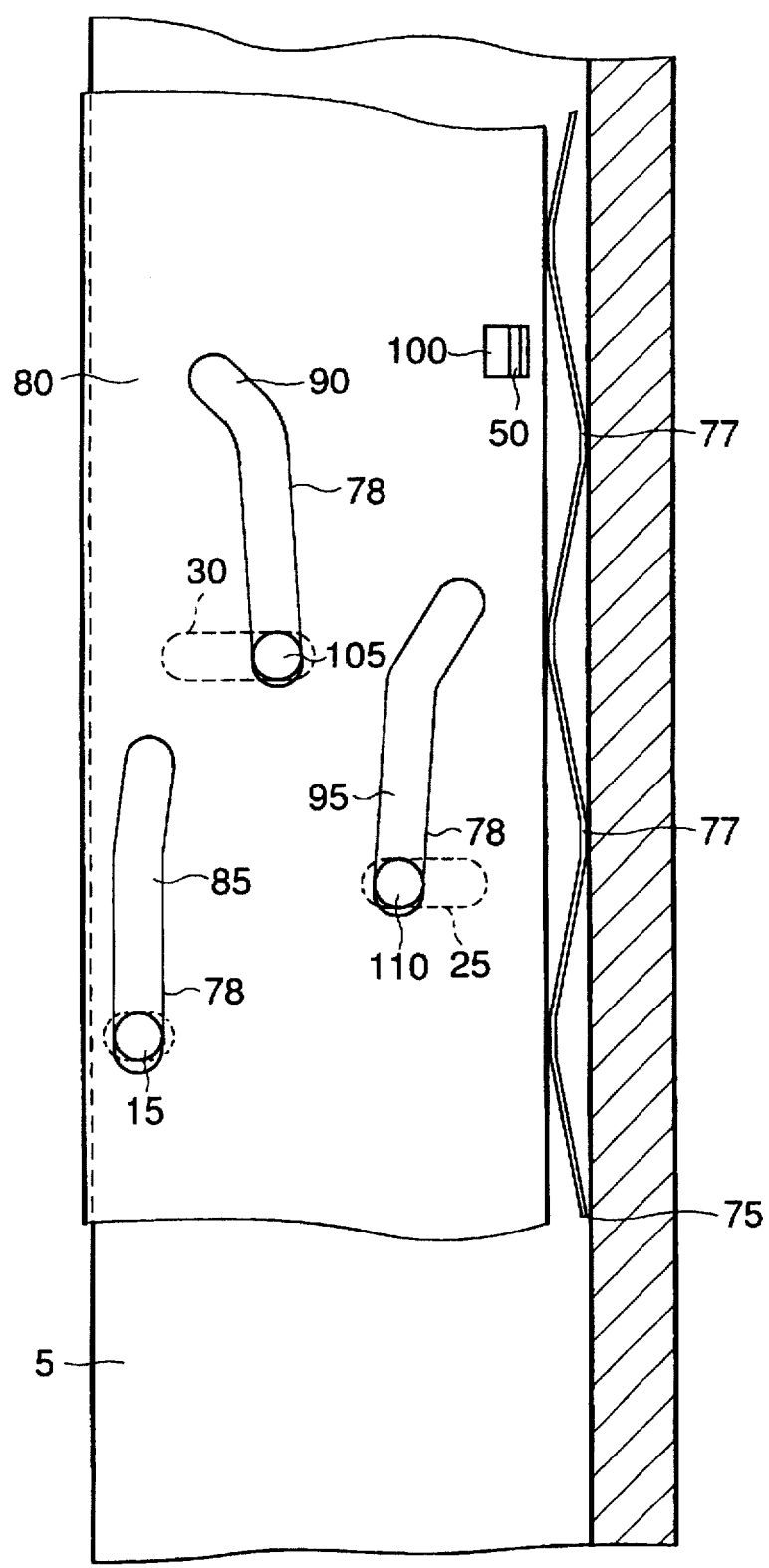
FIG. 4 is a development view corresponding to FIG. 2 and showing a positional relationship between the cam member, the engagement pin and the biasing member among the components of the first embodiment.

FIGS. 1 to 4 illustrate a zoom lens barrel in accordance with a first embodiment of the present invention. FIG. 1 is a sectional view showing where an optical system is disposed for a wide-angle image photography in the zoom lens barrel in the first embodiment (hereinafter referred to a wide-angle state). FIG. 2 is a sectional view illustrating where the optical system is disposed for a telescopic image photography (hereinafter referred to as a telescopic state). FIGS. 3 and 4 corresponding to FIGS. 1 and 2 are development views each showing a positional relationship between a cam member, an engagement pin and a biasing member among components in the first embodiment. At first, a construction of the first embodiment will be explained with reference to FIGS. 1 to 4.

Referring first to FIG. 1, a fixed drum 5 includes a mount portion 10 so formed at a rear end thereof as to attach the fixed drum 5 to a camera body. The fixed drum 5 also includes large- and small-diameter portions 15, 20 at its front end.

The large-diameter portion 15 is provided with a focusing operation member 35, a zoom ring 45 and a stop ring 55 so disposed as to be movable only in peripheral directions about the optical axis. The focusing operation member 35 is an annular member for performing a focusing operation manually, and a rear end thereof is fitted to an inner peripheral surface of the large-diameter portion. The zoom ring 45 is an annular member for effecting a zooming operation manually and fitted to an outer peripheral surface of the central part of the large-diameter portion 15. Further, the stop ring 55 is an annular member for manually setting a diaphragm and fitted to an outer peripheral surface of the rear end of the large-diameter portion 15.

The small-diameter portion 20 is provided with a first lens support member 60, a second lens support member 70 and a cam member 80. The first lens support member 60 is a member for moving a first movable lens unit L1. The first lens support member 60 is so provided on an inner peripheral surface of the front end part of the small-diameter portion 20 as to be movable in the optical-axis direction through an engagement pin 105 and a rectilinear groove 30 formed in the small-diameter portion 20. On the other hand, the second lens support member 70 is a member for supporting and moving a second movable lens unit L2. The second lens support member 70 is so provided on the inner peripheral surface of the rear end part of the small-diameter portion 20 as to be movable in the optical-axis direction through an engagement pin 110 and a rectilinear groove 25 formed in the small-diameter portion 20. Note that the engagement pins 105, 110 is contrived to increase its wear and abrasion resistance by attaching, onto its outer peripheral surface, a reinforcing member composed of acetal resin exhibiting a self-lubricating property such as Delrin (trade name).

The cam member 80 is an annular member so fitted to the outer peripheral surface of the small-diameter portion 20 as to be movable in the circumferential direction and in the optical-axis direction as well. The cam member 80 engages the zoom ring 45 through a groove 100 formed in a rear end part thereof and a protrusion 50 formed on an inner peripheral surface of the rear end of the zoom ring 45, a part of the protrusion 50 being inserted in the groove 100. Accordingly, the cam member 80 is moved by gaining a driving force in the circumferential direction about the optical axis from the zoom ring 45.

Further, the cam member 80 is formed with a cam groove 85 serving as a cam member driving cam groove of the present invention and cam grooves 90, 95 as lens driving cam grooves of the present invention. Engagement pins 115, 105, 110 are inserted in the respective cam grooves. With this construction, the cam member 80 engages with the small-diameter portion 20 of the fixed drum 5, first lens support member 60 and the second lens support member 70. Note that a surface 78 (FIG. 3) on the rear side of the lens barrel corresponds to the frictional portion for generating the frictional force between the respective engagement pins according to the present invention in the above respective cam grooves.

As illustrated in FIG. 3, the engagement pins 115, 105, 110 are positioned upward of the Figure in the individual grooves (hereinafter referred to as a wide-angle side) when the lens barrel is in the wide-angle state in first embodiment. Contrastingly when in the telescopic state, the respective engagement pins are positioned downward of the Figure in the individual cam grooves (hereinafter referred to as a telescopic side) (FIG. 4).

In the cam grooves 90, 95, angles (indicated by e.g., a in the Figure) made by the cam grooves (A, C) on the wide-angle side and a straight line G parallel to the optical axis are smaller than angles (e.g., b in the Figure) made by the cam grooves (B, D) on the telescopic side and the straight line G. Hence, when the lens barrel is in the wide-angle state, a moving quantity of the first and second movable lens units L1, L2 with respect to a unit rotational angle of the cam member 80 are large. Contrastingly when the lens barrel is in the telescopic state (FIGS. 2 and 4), the moving quantities of the first and second movable lens units L1, L2 with respect to the unit rotational angle of the cam member 80 are small.

On the other hand, the cam groove 85 serves to move the cam member 80 in the optical-axis direction when the cam member 80 makes a rotational motion. The cam member groove 85 is positioned on the side of a biasing member 75 on the wide-angle side (indicated by E in the Figure) where there is a large sum of the moving quantities of the first and second movable lens units L1, L2 with respect to the unit rotational angle of the cam member 80. While on the telescopic side (indicated by F in the Figure) where the sum of the moving quantities thereof is small, the cam groove 85 is provided in a position farther from the biasing member 75 than on the wide-angle side. Accordingly, the cam member 80 moves forwardly of the lens barrel in the wide-angle state but moves backwardly of the lens barrel in the telescopic state.

Note that the cam groove 90 is so formed to make a smaller angle by the straight line G than in the case of the ordinal cam member because of the cam member 80 moving in the optical-axis direction as described above in accordance with the first embodiment. Further, the cam groove 95 is so formed as to make a larger angle by the straight line G than in the case of the ordinary cam member. This arrangement is made in consideration of an influence of the optical-axis directional movement of the cam member 80 with respect to the positional control of the movable lens units by the cam grooves 90, 95.

The biasing member 75 is a member for adjusting the frictional force generated in each of the portions by biasing the cam member 80 in the optical-axis direction, preventing a backlash of the cam member 80 and applying a proper pressure on each of the frictional portions 77, 78. The biasing member 75 is so provided on the rear edge surface of the cam member 80 as to move together with the cam member 80 in the circumferential direction on the outer peripheral surface of the small-diameter portion 20. Further, the biasing member 75 contacts the rear part of the fixed drum 5 so that the biasing member 75 is capable of making a relative motion in the frictional portion 77. Accordingly, the cam member 80 rotates, and, when the biasing member 75 also rotates interlocking therewith, a frictional force acting in such a direction as to resist the kinetic direction of the cam member 80 is generated in the frictional portion 77, thereby restraining the motion of the cam member 80.

In accordance with the first embodiment, the biasing member 75 involves the use of the resilient member such as a plate spring assuming an undulate shape as shown in FIG. 3 and is disposed to exhibit the resiliency in the optical-axis direction. The biasing member 75 is lightly collapsed by the cam member 80 and the fixed drum 5, thereby applying the biasing forces to the cam member 80 forwardly of the lens barrel and to the frictional portions 77, 78 as well.

A stop driving member 120 illustrated in FIG. 1 or 2 is a member for driving a stop mechanism of the lens barrel by a driving force transferred from an unillustrated camera body and is mounted in an inside-diameter portion of the fixed drum 5 that is closer to the mount portion 10. On the other hand, a set of stop blades 122 are defined as a member for restricting the flux of light beam within the lens barrel. A stop driving plate 121 is a member for obtaining the driving force from the stop driving member 120 and driving the stop blades 122. Both of the stop driving plate 121 and the stop blades 122 are provided in the inside-diameter portion of the second lens support member 70.

A first lens unit support member 125 is a member for supporting the first movable lens unit L1. The first lens unit support member 125 includes a female helicoid 130 provided on an inner peripheral surface thereof. The first lens unit support member 125 is secured to the foremost end of the lens barrel by screwing a male helicoid 65 into the female helicoid 130, the helicoid 65 being formed on the outer peripheral surface of the front end part of the first lens support member 60. Further, a protrusion 135 is formed on the outer peripheral surface of the rear end of the first lens unit support member 125. The protrusion 135 engages with the rectilinear groove 40 formed in the inner peripheral surface of the front end part of the focusing operation member 35. Based on this construction, the driving force applied to the zoom ring 45 is transferred via the first lens support member 60 and the male helicoid 65 (female helicoid 130), whereby the first lens group support member 125 moves back and forth in the optical-axis direction.

Next, the operation of this embodiment will be described.

FIG. 3 illustrates a state where the cam member 80 is sufficiently rotated counterclockwise as viewed from the rear side of the lens barrel. In this state, the individual engagement pins in the Figure are positioned in the respective grooves on the wide-angle side (A, C, E). Then, the first movable lens unit L1 is positioned on the foremost side of the lens barrel within the movable range thereof, while the second movable lens unit L2 is positioned on the rearmost side thereof.

Further, the cam member 80 is positioned on the foremost side of the lens barrel within the movable range, and the biasing member 75 is smallest of its resilient deformation quantity. Hence, the biasing member 75 imparts small biasing forces to the cam member 80 and the frictional portions 77, 78 as well.

When the zoom ring 45 is rotated clockwise (upward in the Figure), the cam member 80 rotates in the same direction interlocking with the zoom ring 45, and the respective engagement pins move downward in the Figure on the wide-angle side of the respective cam grooves. With this movement, the first movable lens unit L1 moves backwardly of the lens barrel, while the second movable lens unit L2 moves forwardly of the lens barrel. As already explained, on the wide-angle side, there are the large moving quantities of the first and second lens units L1, L2 with respect to the unit rotational angle of the cam member 80. Accordingly, a moving force (hereinafter termed a lens moving force) required by the cam member for moving the movable lens units increases within this range.

On the other hand, the frictional portions 77, 78 are pressurized by a small force of the biasing member 75, and hence the frictional forces generated in the frictional portions 77, 78 decrease. Accordingly, there is also a small driving force (hereinafter called a cam driving force) needed by the cam member 80 for the rotation resisting those frictional force.

If the cam member 80 continues to further rotate clockwise, the individual engagement pins shift on the telescopic side (B, D, F) in the respective cam grooves (FIG. 4), and the moving quantities of the first and second movable lens units L1, L2 with respect to the unit rotational angle of the cam member 80 are reduced. Consequently, the lens moving force decreases in this range.

On the other hand, the cam member 80 moves backwardly of the lens barrel, and the biasing member 75 deforms more largely than in the wide-angle state. As a result, the large biasing forces work on the frictional portions 77, 78, and the frictional forces produced in these portions increase. Hence, the cam driving force also increases.

In accordance with the first embodiment, a configuration of the cam groove 85 is determined so that a sum of the lens moving force and the cam driving force always remains the same irrespective of a rotational position of the cam member 80. Accordingly, a quantity of force required for operating the zoom ring 45 remains the same regardless of whether the lens barrel is in the wide-angle state or in the telescopic state.

Thus, in accordance with the first embodiment, the frictional portion is biased by the biasing member 75, and, further, the biasing force thereof is increased or decreased by causing the resilient deformation of the biasing member 75, thus adjusting a magnitude of the frictional force resisting the rotational motion of the cam member 80. Hence, in the first embodiment, the frictional force can be adjusted with remarkable easiness.

Further, the member for resiliently deforming the biasing member 75 involves the use of the cam member 80 constructed such that the cam member hitherto used for moving the movable lens unit is newly formed with the cam groove 85, and the cam member 80 itself is moved in the optical-axis direction. With this arrangement, the lens barrel in the first embodiment can be produced more readily at a lower cost than in the conventional lens barrel without remarkably increasing the number of manufacturing processes and the number of parts as well.

Second Embodiment

Figure 5:
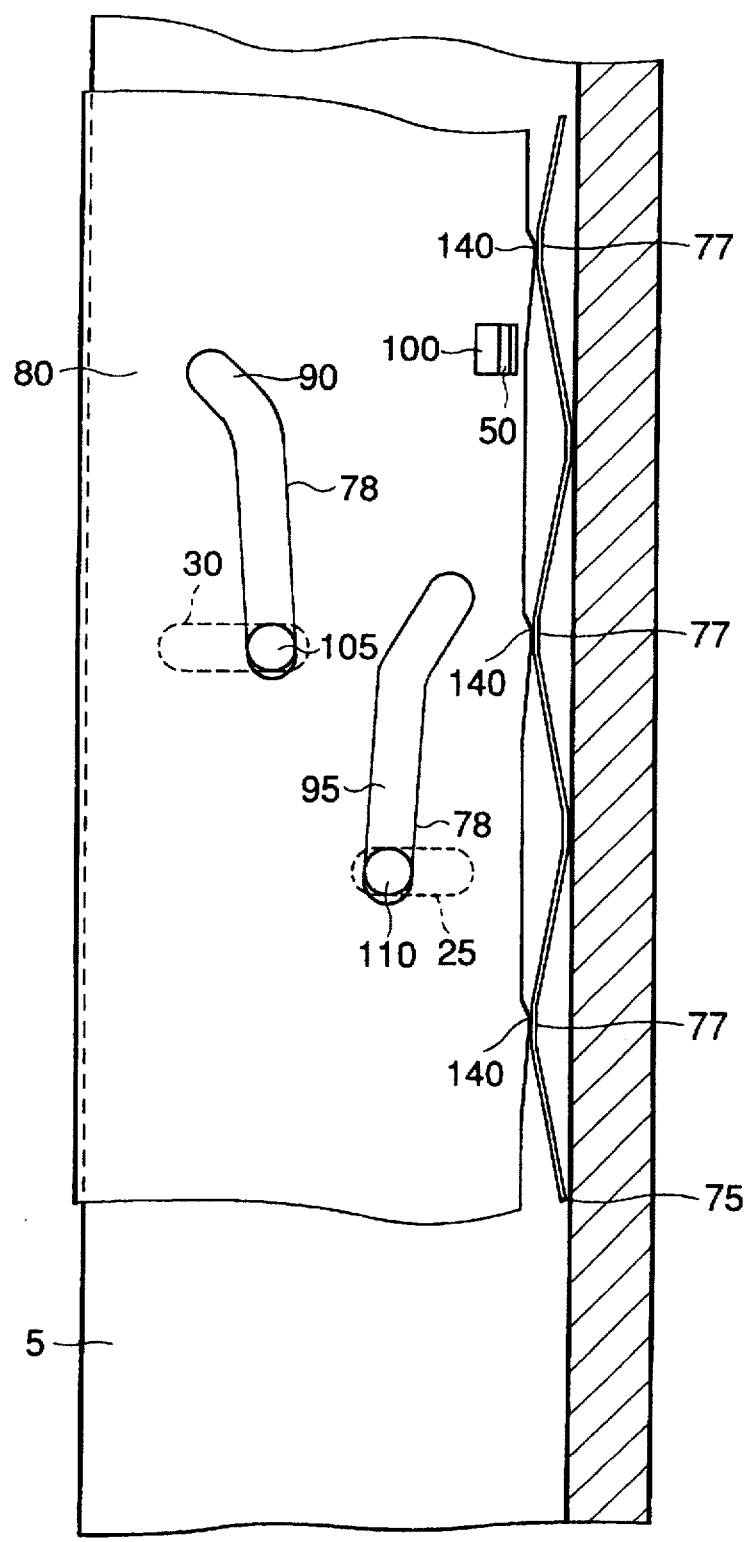
FIG. 5 is a view illustrating a second embodiment of the present invention.

FIG. 5 is a view illustrating a second embodiment of the lens barrel according to the present invention and corresponds to FIG. 3 or 4 in the first embodiment. Note that the members performing the same functions as those in the first embodiment are marked with the like numerals, and the repetitive explanations thereof will hereinbelow be properly omitted.

In accordance with the second embodiment, the cam member 80 is formed with no cam groove corresponding to the cam groove 85 in the first embodiment. Accordingly, the cam member 80 does not move in the optical-axis direction. On the other hand, the biasing member 75 is fixed not to the cam member 80 but to the fixed drum 5. Therefore, the frictional portion 77 is a portion contacting the rear end surface of the cam member 80.

Furthermore, a protrusion 140 is formed on the rear end surface of the cam member 80. When the cam member 80 is moved in the circumferential direction so that the lens barrel is brought into the telescopic state, the biasing member 75 is pushed by the protrusion 140 in the optical-axis direction and thereby resiliently deformed. As a consequence, the frictional forces generated in the frictional portions 77, 78 increase in magnitude.

Thus, in accordance with the second embodiment, the frictional forces produced in the frictional portions 77, 78 are adjusted by the protrusion formed on the rear end part of the cam member 80 and assuming the configuration adapted to properly resiliently deform the biasing member 75 in relation to the position of the cam member in the circumferential direction.

In the first embodiment, the cam grooves 90, 95 for moving the first and second movable lens units L1, L2 have to be adequately designed in their configurations while being related to the cam groove 85 so that the cam member 80 itself moves in the optical-axis direction. In accordance with the second embodiment, however, there is no necessity for such an elaborate design, and, instead, the cam member 80 may be easily designed.

Other Embodiments

It is to be noted that the present invention is not limited to the embodiments discussed above. The above-described embodiments have been exemplified, and there can be carried out any kind of embodiments having substantially the same technical concept in construction as that claimed in the claims of the present invention and exhibiting the same operation as well without departing from the technical scope of the present invention.

1) The biasing member 75 is not confined to the exemplified resilient member in the embodiments discussed above but may take other forms capable of properly biasing the frictional portion. The biasing member may involve the use of, for example, a rubber member and a coil spring member or may be a member making use of a magnetic force of an electromagnet or a compressibility of a fluid.

2) In the connection with the second embodiment, the positional relationship between the protrusion 140 of the biasing member 75 is not limited to that exemplified in FIG. 5 but may be other positional relationship on condition that the frictional force generated in the frictional portion 77 acts in the circumferential direction of the cam member 80. For instance, the biasing member 75 is fixed to the cam member 80, and the protrusion 140 may be provided on the fixed drum 5. Further, the protrusion is formed on the outer peripheral surface (the inner peripheral surface of the large-diameter portion 15 of the fixed cylinder 5) of the cam member 80, and the biasing member 75 may also be fixed to the inner peripheral surface (the outer peripheral surface of the cam member 80) of the large-diameter portion 15 of the fixed drum 5.

3) The method of adjusting the magnitude of the frictional force applied on the cam member 80 is not confined to the method of changing the magnitude of the biasing force acting on the friction portion, which method has been described in the embodiments given above. For example, the above method may be a method of adjusting the magnitude of the frictional force, which involves a variation in a frictional coefficient corresponding to the rotational position of the cam member 80 by changing surface roughness of the surface contacting the frictional portion.

As discussed in detail, according to the present invention, the frictional force applying member applies the frictional force on the lens moving member, and, for this purpose, the quantity of force for operating the lens moving member remains the same irrespective of the moving state of the movable lens unit. Hence, there is such an advantage that a sense of operating the lens moving member becomes preferable.

The biasing force adjusting member adjusts the biasing force of the biasing member corresponding to the magnitude of the moving force for moving the movable lens unit, thereby increasing or decreasing the frictional force generated in the frictional portion. Hence, there is produced such an advantage that the frictional force can be easily surely adjusted.

The lens moving member includes the biasing force adjusting member. The biasing force adjusting member is the cam member having the lens moving cam and the frictional force adjusting cam. This construction brings about an advantage in which the lens barrel of the present invention can be produced readily and at low cost.

What is claimed is:

1. A lens barrel comprising:
   a movable lens unit movable in an optical-axis direction;
   a lens moving member to move said movable lens unit;
   a frictional force applying member to apply a frictional force on said lens moving member so that a quantity of force for operating said lens moving member remains the same irrespective of a magnitude of the moving force for moving said movable lens unit,
   wherein said frictional force applying member includes:
   a frictional portion to generate the frictional force;
   a biasing member to bias said frictional portion; and
   a biasing force adjusting member to adjust a biasing force of said biasing member corresponding to a magnitude of the moving force to move said movable lens unit, the frictional force generated in said frictional portion being thereby increased or decreased with a variation in the biasing force of said biasing member.

2. The lens barrel according to claim 1, wherein said lens moving member has a biasing force adjusting member,
   said biasing force adjusting member is a cam member formed with a lens moving cam groove to move said movable lens unit in the optical axis direction and movable in a circumferential direction about the optical axis,
   said cam member is further formed with a cam member moving cam groove to move said cam member in the optical-axis direction corresponding to the magnitude of the moving force to move said movable lens unit, and
   the biasing force of said biasing member is thereby changed with the movement of said cam member in the optical-axis direction.

3. A lens barrel comprising:

a fixed drum to hold a lens unit so as to be movable in an optical-axis direction;

a ring rotated manually;

a cam member to move said lens unit in the optical-axis direction by rotation thereof with the rotation of said ring;

a frictional force applying member, disposed between said cam member and said fixed drum, to apply a frictional force on said cam member; and an adjusting member to adjust the frictional force applied on said cam member by said frictional force applying member so that an amount of a lens moving force corresponding to an optical-axis directional moving quantity of said lens unit with respect to a unit rotational angle of said cam member and a cam driving force required to rotate said cam member against the frictional force applied on said cam member by said frictional force applying member substantially remains the same.

4. A lens barrel comprising:

a movable lens unit movable in an optical axis direction;

a frictional force applying member to apply a frictional force on said movable lens, said frictional force being adjusted to correspond to a magnitude of the moving force to move said movable lens unit.

5. A method of applying a biasing force to a moveable lens unit in a lens barrel, said method comprising the steps of:

using a moving force to move said moveable lens unit in an optical axis direction;

applying a frictional force to said movable lens; and adjusting a biasing force to correspond to a magnitude of the moving force .

* * * * *